(12) United States Patent
Goto

(10) Patent No.: US 10,021,004 B2
(45) Date of Patent: Jul. 10, 2018

(54) COMMUNICATION DEVICE, CONTROL METHOD FOR COMMUNICATION DEVICE, AND PROGRAM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/608,779

(22) Filed: May 30, 2017

(65) Prior Publication Data
US 2017/0264515 A1    Sep. 14, 2017

Related U.S. Application Data

(63) Continuation of application No. 14/337,042, filed on Jul. 21, 2014, now Pat. No. 9,699,047, which is a
(Continued)

(30) Foreign Application Priority Data

Jan. 25, 2013    (JP) ................................ 2013-012136

(51) Int. Cl.
*H04L 12/26* (2006.01)
*H04W 84/12* (2009.01)
*H04W 24/08* (2009.01)
*H04L 29/08* (2006.01)
*H04M 1/725* (2006.01)

(52) U.S. Cl.
CPC .............. *H04L 43/08* (2013.01); *H04L 67/16* (2013.01); *H04M 1/7253* (2013.01); *H04W 24/08* (2013.01); *H04W 84/12* (2013.01)

(58) Field of Classification Search
CPC ...... H04L 43/08; H04L 67/16; H04M 1/7253; H04W 24/08; H04W 84/12
See application file for complete search history.

(56) References Cited

U.S. PATENT DOCUMENTS 9,521,277 B1 * 12/2016 Johnson .............. H04N 1/00315
9,807,677 B2 * 10/2017 Kim ...................... H04W 48/14
(Continued)

FOREIGN PATENT DOCUMENTS

CN    101690134 A    3/2010
CN    101924844 A    12/2010
(Continued)

*Primary Examiner* — Kostas Katsikis
(74) *Attorney, Agent, or Firm* — Canon U.S.A., Inc. IP Division

(57) ABSTRACT

A communication device capable of handling, even in the case where requests for provision of a service are received from a plurality of devices, the requests appropriately, is provided.
A communication device which provides a service to a service utilizing device which utilizes a service, determines whether or not the communication device is executing a service requested from the service utilizing device. In the case where it is determined that the communication device is executing the service, the communication device makes a response to the request with the contents of the response changed according to whether or not the service is able to be provided to a plurality of service utilizing devices.

9 Claims, 7 Drawing Sheets

Related U.S. Application Data continuation of application No. PCT/JP2014/050502, filed on Jan. 15, 2014.

(56) References Cited

U.S. PATENT DOCUMENTS

| | | | | |
|---|---|---|---|---|
| 9,882,880 | B2* | 1/2018 | Goto | H04L 63/0428 |
| 9,883,376 | B2* | 1/2018 | Shin | H04W 8/24 |
| 9,900,829 | B2* | 2/2018 | Goto | H04W 48/16 |
| 2010/0315676 | A1 | 12/2010 | Nago | |
| 2012/0320886 | A1* | 12/2012 | Anders, Jr. | H04W 76/023 370/338 |
| 2013/0040576 | A1* | 2/2013 | Yoon | H04W 8/005 455/41.2 |
| 2013/0148149 | A1* | 6/2013 | Park | G06F 3/1296 358/1.13 |
| 2013/0316705 | A1* | 11/2013 | Kneckt | H04L 67/16 455/435.1 |
| 2013/0346553 | A1* | 12/2013 | Shin | H04W 76/23 709/217 |
| 2014/0006633 | A1* | 1/2014 | Uchikawa | H04W 76/10 709/227 |
| 2014/0051360 | A1* | 2/2014 | Kim | H04W 4/08 455/41.2 |
| 2014/0201415 | A1* | 7/2014 | Huang | G06F 13/00 710/303 |
| 2014/0258395 | A1* | 9/2014 | Tng | H04L 67/16 709/204 |
| 2014/0314065 | A1* | 10/2014 | Song | H04W 8/005 370/338 |
| 2014/0337415 | A1* | 11/2014 | Tachibana | H04L 67/06 709/203 |
| 2014/0349578 | A1* | 11/2014 | Huang | H04L 67/16 455/41.2 |
| 2014/0351475 | A1* | 11/2014 | Huang | G06F 13/4068 710/303 |
| 2014/0351476 | A1* | 11/2014 | Huang | G06F 1/1632 710/303 |
| 2015/0006719 | A1* | 1/2015 | Gupta | H04L 67/16 709/224 |
| 2015/0201035 | A1* | 7/2015 | Profit | H04L 67/2842 709/213 |
| 2015/0206190 | A1* | 7/2015 | Lee | H04W 48/16 705/14.64 |
| 2015/0327313 | A1* | 11/2015 | Kim | H04W 76/14 370/329 |
| 2015/0334638 | A1* | 11/2015 | Kim | H04W 48/14 370/329 |
| 2015/0334749 | A1* | 11/2015 | Goto | H04W 8/005 370/254 |
| 2015/0341849 | A1* | 11/2015 | Lee | H04W 48/16 455/41.2 |
| 2017/0156109 | A1* | 6/2017 | Uchikawa | H04W 48/16 |

FOREIGN PATENT DOCUMENTS

| | | |
|---|---|---|
| JP | 2008-035374 A | 2/2008 |
| JP | 2011-35768 A | 2/2011 |
| JP | 2012-244392 A | 12/2012 |
| JP | 2013-013013 A | 1/2013 |
| WO | 2009009394 A1 | 1/2009 |

* cited by examiner

COMMUNICATION DEVICE, CONTROL METHOD FOR COMMUNICATION DEVICE, AND PROGRAM

CROSS-REFERENCE TO RELATED APPLICATIONS

This application is a Continuation of U.S. application Ser. No. 14/337,042, filed Jul. 21, 2014, which is a Continuation of International Patent Application No. PCT/JP2014/050502, filed Jan. 15, 2014, which claims the benefit of Japanese Patent Application No. 2013-012136, filed Jan. 25, 2013, both of which are hereby incorporated by reference herein in their entirety.

TECHNICAL FIELD

The present invention relates to a communication device, a control method for a communication device, and a program.

BACKGROUND ART

In recent years, there have been increasing cases where electronic devices, such as digital cameras and printers, having a wireless LAN station function are connected to a wireless LAN and are used as communication devices. For example, Patent Literature 1 discloses a method for providing a digital camera with a wireless LAN function and facilitating image sharing.

Further, a standard called Wi-Fi Direct® has been established by Wi-Fi Alliance. Wi-Fi Direct defines a protocol for determining whether individual electronic devices operate as a wireless LAN access point or a wireless LAN station. By executing the protocol, an electronic device operating as a wireless LAN access point and an electronic device operating as a wireless LAN station may be automatically determined. The use of Wi-Fi Direct eliminates the necessity of separately providing an access point, and electronic devices are able to directly communicate with each other to execute various services (image sharing, printing, etc.), thereby improving the user-friendliness.

Furthermore, a function of searching for the content of a service provided by a different device in an application layer (service discovery function) is defined as an optional function of Wi-Fi Direct. With the service discovery function, a user of an electronic device is able to know, before performing connection processing, information on a service provided by an electronic device with which the electronic device the user is operating is to be connected, thereby improving the user-friendliness.

CITATION LIST

Patent Literature

PTL 1: Japanese Patent Laid-Open No. 2011-35768

However, in the case where a device which provides a service is not a wireless LAN access point but is a wireless LAN station, there is a problem that it is difficult for the device to provide the various services to a plurality of devices. Further, there may be some cases where a service is not allowed to be provided to a plurality of devices at the same time.

Accordingly, an object of the present invention is to provide a communication device capable of appropriately handling, even when requests for provision of a service are received from a plurality of devices, the requests.

SUMMARY OF INVENTION

In order to achieve the above-mentioned object, a communication device according to the present invention includes service providing means for providing a service to a service utilizing device which utilizes a service; determining means for determining whether or not the communication device is executing a service requested from the service utilizing device; and responding means for making, in a case where it is determined by the determining means that the communication device is executing the service, a response to the request with contents of the response changed according to whether or not the service is able to be provided to a plurality of service utilizing devices.

Furthermore, in order to achieve the above-mentioned object, a communication device according to the present invention includes service providing means for providing a service to a service utilizing device which utilizes a service; determining means for determining whether or not the communication device is executing a service requested from the service utilizing device; and responding means for making, in a case where it is determined by the determining means that the communication device is executing the service, a response to the request with contents of the response changed according to an instruction from a user.

In order to achieve the above-mentioned object, a communication device capable of wireless communication according to the present invention includes service providing means for performing wireless communication with a service utilizing device which utilizes a service and providing a service; determining means for determining whether or not the communication device is executing a service requested from the service utilizing device; and responding means for making, in a case where it is determined by the determining means that the communication device is executing the service, a response to the request with contents of the response changed according to a role of the communication device in a wireless layer.

Further features of the present invention will become apparent from the following description of exemplary embodiments with reference to the attached drawings.

DESCRIPTION OF EMBODIMENTS

First Embodiment

Hereinafter, a communication device according to this embodiment will be explained in detail with reference to the drawings. Although an example in which a wireless LAN system conforming to IEEE 802.11 series is used will be explained below, a communication form is not necessarily limited to the wireless LAN conforming to IEEE 802.11.

A hardware configuration in a case suitable for this embodiment will be explained.

Figure 1:
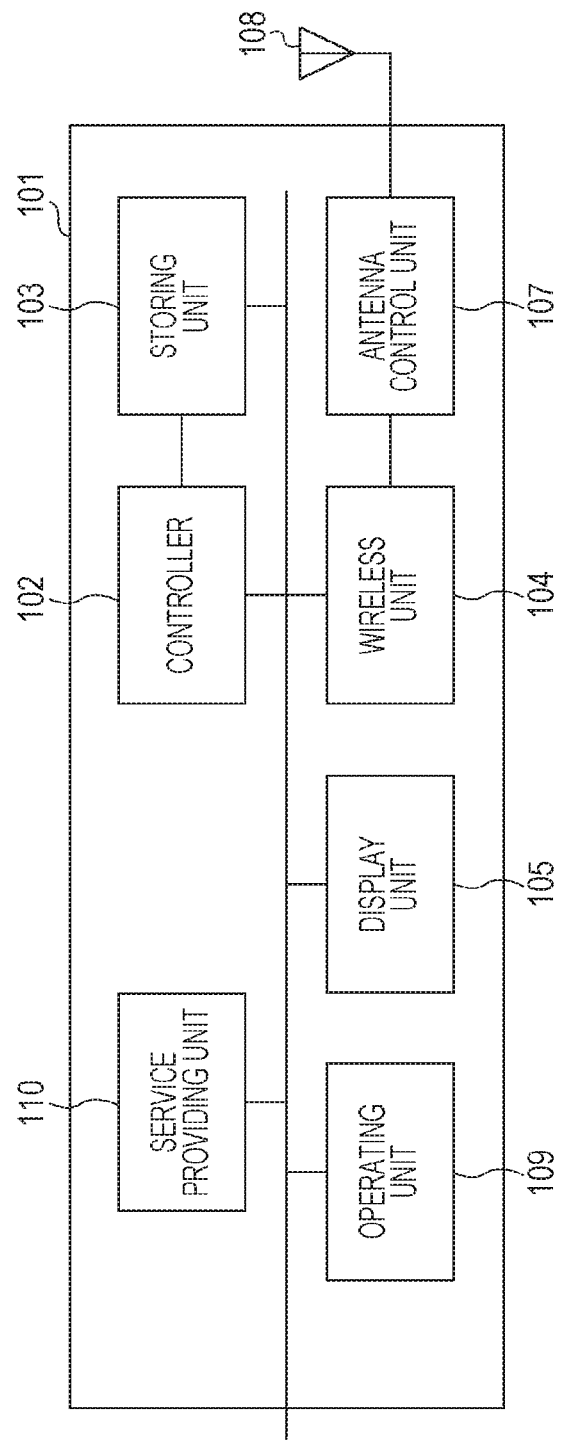
FIG. 1 illustrates blocks forming a device.

FIG. 1 is a block diagram illustrating an example of a configuration of individual devices described below according to an embodiment to which the present invention may be applied. 101 represents the entire device. 102 represents a controller which controls the entire device by executing a control program stored in a storing unit 103. The controller 102 includes one or more processors, such as CPUs or MPUs. The controller 102 also performs setting control for a communication parameter with a different device. 103 represents the storing unit which stores the control program executed by the controller 102 and various types of information including a communication parameter. Further, image data, files, and the like that have been generated in the communication device or received from an external device may be stored in the storing unit 103. The storing unit 103 may be a memory of any type, such as a ROM, a RAM, an HDD, or a flash memory. Various operations described below are performed when the controller 102 executes the control program stored in the storing unit 103.

104 represents a wireless unit for performing wireless LAN communication conforming to IEEE 802.11. 105 represents a display unit which performs various types of display. The display unit 105 has a function of being capable of outputting visually recognizable information, such as an LCD or an LED, or outputting sound, such as a speaker. The display unit 105 has a function of outputting at least one of visual information and sound information.

107 represents an antenna control unit and 108 represents an antenna. The antenna control unit 107 controls the antenna 108 to transmit and receive signals via wireless communication. 109 represents an operating unit with which a user inputs various data or the like and operates the communication device. The operating unit 109 includes various buttons, a touch panel, and the like.

A service providing unit 110 has a function of providing application-level service information provided by the communication device. For example, in the case where the communication device is a printer, the service providing unit 110 provides a printing function, and in the case where the communication device is a digital camera, the service providing unit 110 provides an image capturing function.

FIG. 1 is merely an example, and the communication device 101 may have a hardware configuration different from the hardware configuration illustrated in FIG. 1.

Figure 2:
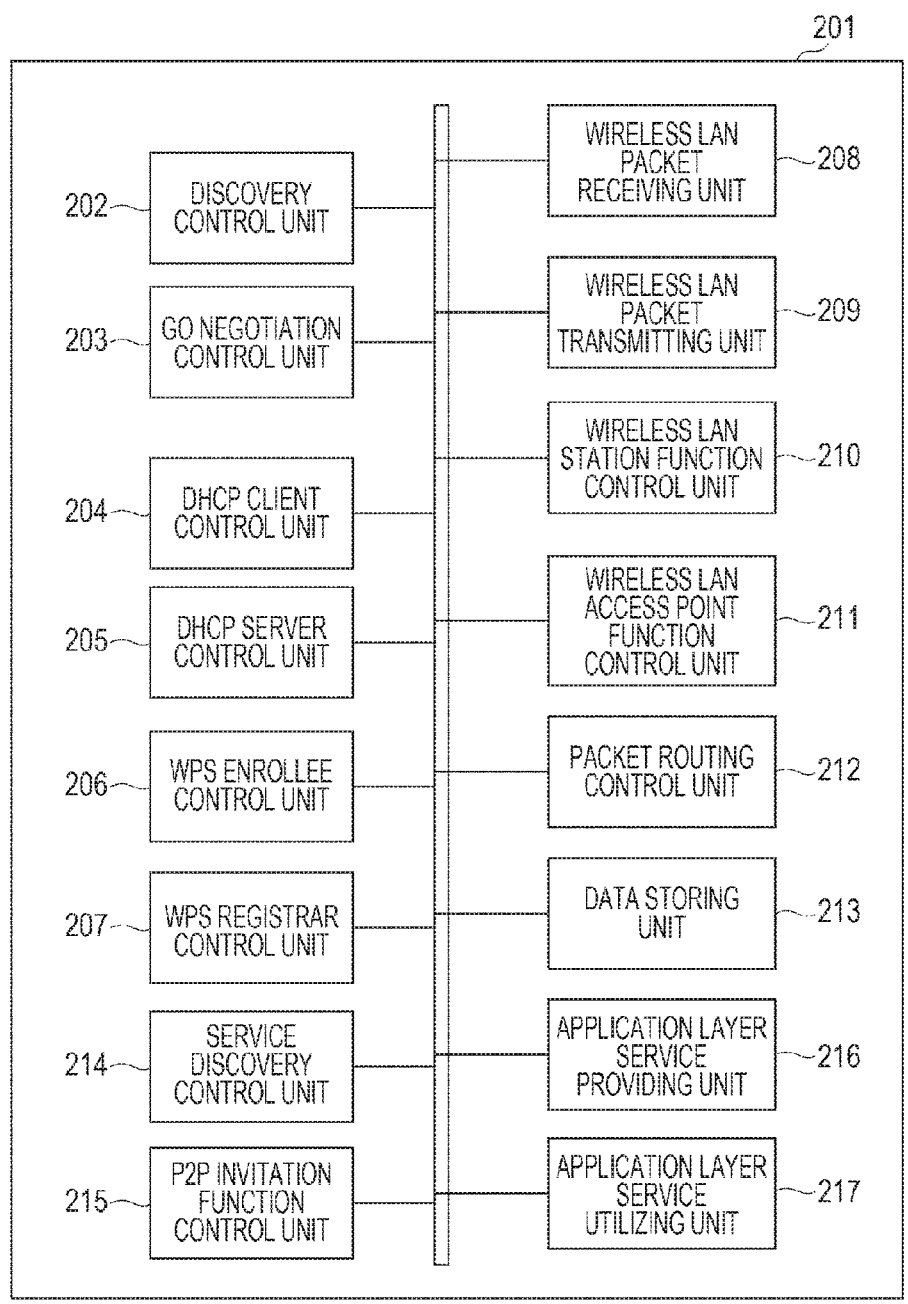
FIG. 2 illustrates software functional blocks within the device.

FIG. 2 is a block diagram illustrating an example of a configuration of software functional blocks which execute a communication control function, which will be described below. 201 represents the entire software functional blocks. 202 represents a Discovery control unit which controls an operation of search processing of searching for a communication device with which the communication device is to communicate.

203 represents a GO Negotiation control unit. The GO Negotiation control unit 203 performs control based on Wi-Fi Direct protocol specifications, and determines the role in a wireless layer, as to which one of communication devices operates as a wireless LAN access point and which one of the communication devices operates as a wireless LAN station. In Wi-Fi Direct, a communication device that implements a wireless LAN access point function is referred to as a P2P group owner (hereinafter, a GO), and a communication device that implements a wireless LAN station function is referred to as a P2P client (hereinafter, a CL). In the case of the GO or the wireless LAN access point, a wireless LAN access point function control unit 211, which will be described later, is activated. In the case of the CL or the wireless LAN station, a wireless LAN station function control unit 210, which will be described later, is activated. The protocol of GO Negotiation is determined based on Wi-Fi Direct specifications. Since this is not a point of the present invention, explanation for this protocol will be omitted. In Wi-Fi Direct, a network established by the GO is referred to as a P2P group. In this description, this network may be described as a P2P group. In this embodiment, this network and the P2P group are described as having the same meaning.

In this description, a group of the P2P group owner (GO), the P2P client (CL), and a communication device whose role has not been determined, are collectively referred to as P2P devices.

204 represents a DHCP client control unit, and is activated when the role of the own communication device is defined as a wireless LAN station by the GO Negotiation control unit 203. 205 represents a DHCP server control unit, and is activated when the role of the own communication device is defined as a wireless LAN access point by the GO Negotiation control unit 203.

206 represents a WPS Enrollee control unit, and receives a communication parameter necessary for wireless LAN communication from a different WPS Registrar device. Similar to the DHCP client control unit 204, the WPS Enrollee control unit 206 operates when the role of the own communication device is a wireless LAN station. 207 represents a WPS Registrar control unit, and provides a communication parameter necessary for wireless LAN communication to a different WPS Enrollee device. Similar to the DHCP server control unit 205, the WPS Registrar control unit 207 operates when the role of the own communication device is a wireless LAN access point. The communication parameter provided by the WPS Registrar is a parameter, such as an SSID serving as a network identifier, an encryption key, an encryption system, an authentication key, or an authentication system.

208 represents a wireless LAN packet receiving unit, and 209 represents a wireless LAN packet transmitting unit. The wireless LAN packet transmitting unit 209 and the wireless LAN packet receiving unit 208 perform transmission and reception of any packets including a communication protocol in a higher-order layer. 210 represents a wireless LAN station function control unit. The wireless LAN station function control unit 210 performs authentication/encryption processing or the like at the time when the own communication device operates as a wireless LAN station, and takes part in a wireless network established by a device operating as a wireless LAN access point. 211 represents a wireless LAN access point function control unit. The wireless LAN access point function control unit 211 establishes a wireless network when the own communication device operates as a wireless LAN access point function, and performs authentication/encryption processing, management of a communication device with which the own communication device communicates, and the like. Either one function of the wireless LAN station function control unit 210 and the wireless LAN access point function control unit 211 may operate or both the functions may operate at the same time.

212 represents a packet routing control unit which performs bridging and routing of a communication packet when the wireless LAN access point function control unit 211 is operating. 213 represents a data storing unit which stores and holds software itself, a wireless LAN parameter, and various tables including the above-mentioned DHCP address table and an ARP table.

214 represents a Service Discovery control unit which has a service discovery function specific to Wi-Fi Direct. With the service discovery function, service information held by a communication device with which the own communication device communicates is received by transmitting and receiving an action frame defined by IEEE 802.11u. Specifically, the Service Discovery control unit 214 transmits an SD Query and receives an SD Response as a response. Alternatively, the Service Discovery control unit 214 receives an SD Query from a communication device with which the own communication device communicates, and transmits an SD Response as a response.

215 represents a P2P Invitation function control unit which controls an Invitation function defined by the Wi-Fi Direct standard. Since the Invitation function is defined in the Wi-Fi Direct specifications, explanation for the Invitation function will be omitted. The Invitation function is a function of causing a GO device or a CL device to urge a P2P device whose role has not been determined to be connected as a P2P client.

216 represents a service providing unit which provides a service of an application layer. Here, the application layer represents a service provision layer in a higher-order layer equal to or higher than the fifth layer in an OSI reference model. That is, the service providing unit 216 provides, for example, a printing function (printing service), an image streaming function (moving image streaming service), a file transfer function (file transfer service), and the like.

217 represents a service utilizing unit in an application layer. The service utilizing unit 217 utilizes a service provided by a service providing unit in an application layer of an opposing device. That is, the service utilizing unit 217 has a function of transmitting a material to be printed to a printing service providing device, a function of transmitting a moving image to a digital display, and the like.

All the functional blocks illustrated in FIG. 2 are not necessarily provided by software. At least part of the functional blocks may be provided by hardware. The individual functional blocks illustrated in FIG. 2 have a mutual relationship. Further, the individual functional blocks illustrated in FIG. 2 are merely examples. A plurality of functional blocks may constitute a functional block. Alternatively, any functional block may be divided into blocks having different functions.

Furthermore, in this embodiment, a service in an application layer is implemented by a device which provides the service and a device which utilizes the service. For example, in the case of a printing service, which is an example of a service in an application layer, a printer serves as a service providing device. The printer receives print data transmitted from a PC or the like and performs printing. In contrast, a device such as a PC serves as a service utilizing device. The device serving as a service utilizing device generates print data, and transmits the generated print data to the printer as a service providing device. Further, in the case of an image streaming service as an example of a service, a display device serves as a service providing device. The display device receives image data transmitted from a PC or the like and displays the received image data. In contrast, a device such as a PC serves as a service utilizing device. The device serving as a service utilizing device generates image data, and transmits the generated image data to the display device serving as a service providing device.

Figure 3:
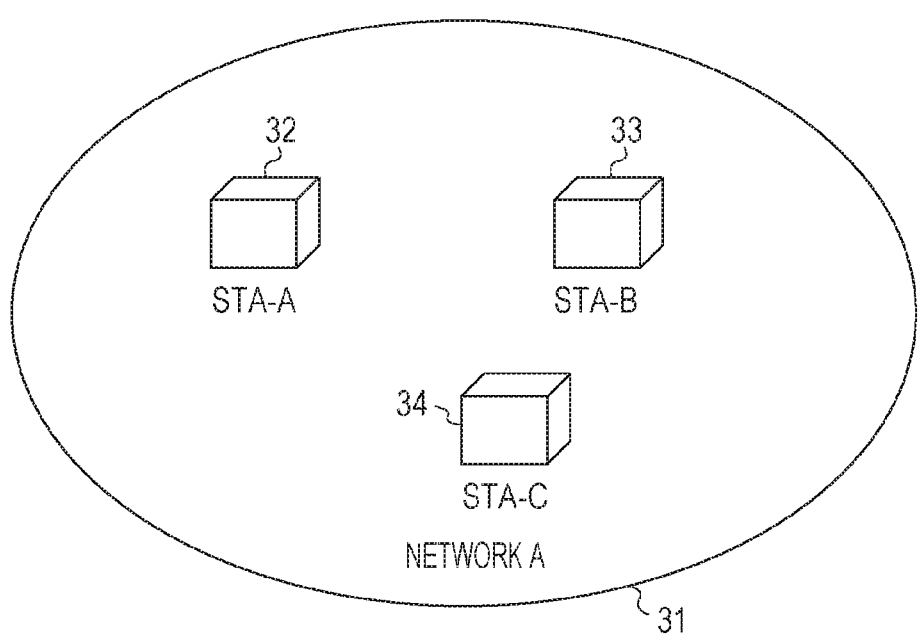
FIG. 3 is a diagram illustrating an example of a network configuration to which the present invention is applied.

FIG. 3 is a diagram illustrating a communication device A 32 (hereinafter, an STA-A), a communication device B 33 (hereinafter, an STA-B), a communication device C 34 (hereinafter, an STA-C), and a network A 31 (hereinafter, a network A) including the STA-A, the STA-B, and the STA-C. All the devices have the configuration illustrated in FIGS. 1 and 2.

Figure 4:
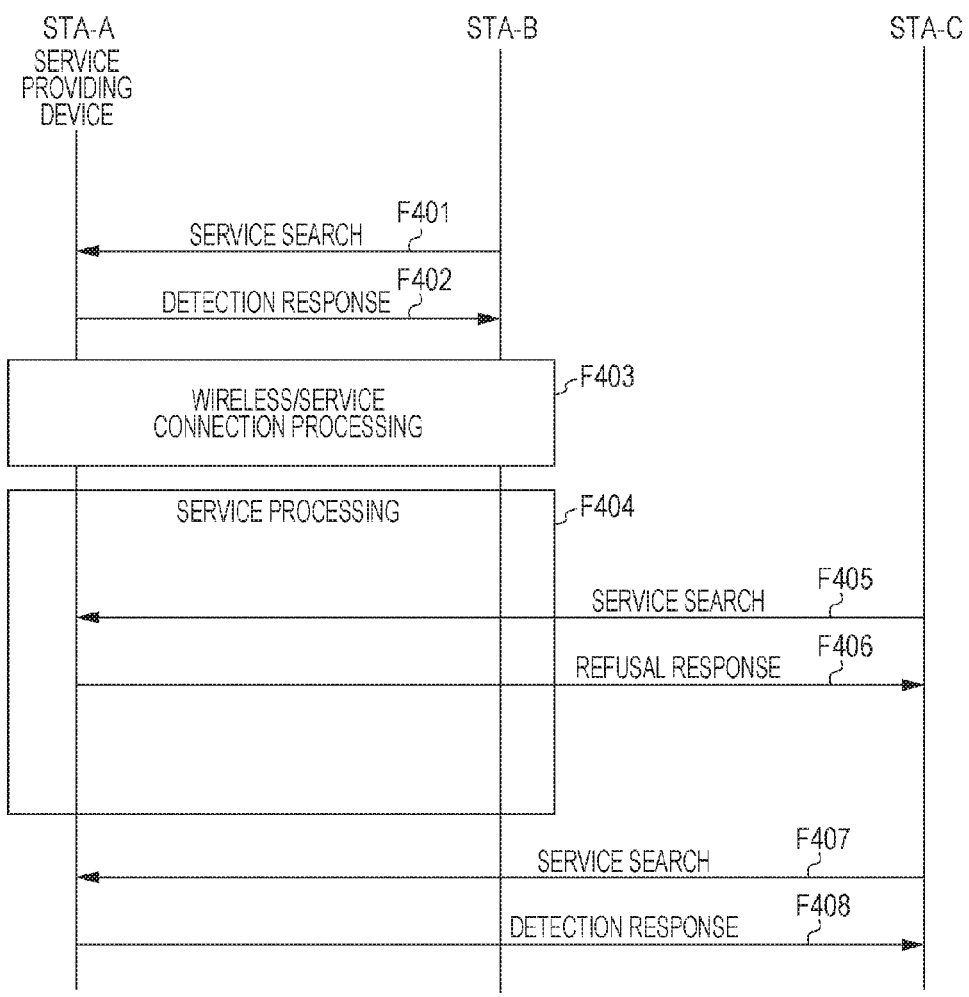
FIG. 4 illustrates a sequence among communication devices to which the present invention is applied.

FIG. 4 is a schematic diagram illustrating an operation sequence among the devices.

In the example of FIG. 4, the STA-A operates as a service providing device, and the STA-B and the STA-C operate as service utilizing devices.

In order to utilize a service, the STA-B transmits an inquiry signal for searching for a communication device which provides the service (F401). The STA-A which has received the inquiry signal transmits a search response signal to the STA-B (F402).

In order to recognize that the STA-A provides a desired service, the STA-B performs connection processing in a wireless layer and predetermined connection processing defined in the service (F403). Although an example in which connection processing in the wireless layer is performed after searching for a service is completed, is explained in this embodiment, the connection processing in the wireless layer may be performed in advance, and only service connection processing may be performed in F403.

Further, the connection processing in the wireless layer is based on the Wi-Fi Direct specifications mentioned above. That is, one of the STA-A and the STA-B serves as a P2P group owner, the other one of the STA-A and the STA-B serves as a P2P client, and the CL performs connection by taking part in a wireless network established by the GO.

After the connection processing is completed, service processing is performed between the STA-A and the STA-B (F404). Here, it is assumed that during execution of the service, a service inquiry signal regarding the service is transmitted from the STA-C, which is different from the STA-B (F405).

The STA-A receives the service inquiry signal from the STA-C. However, since the STA-A is executing the service for the STA-B, the STA-A notifies the STA-C that provision of the service to the STA-C is refused (F406). Specifically, the STA-A transmits a signal, such as Busy.

Here, as described later, in the case where the STA-A is able to provide a service to a plurality of communication devices at the same time, a search response signal indicating that the service is able to be provided may be transmitted in F406.

In contrast, in the case where after the STA-A has completed the provision of the service to the STA-B and a service inquiry signal regarding the service is transmitted again from the STA-C (F407), the STA-A transmits a search response signal to the STA-C (F408).

Figure 5:
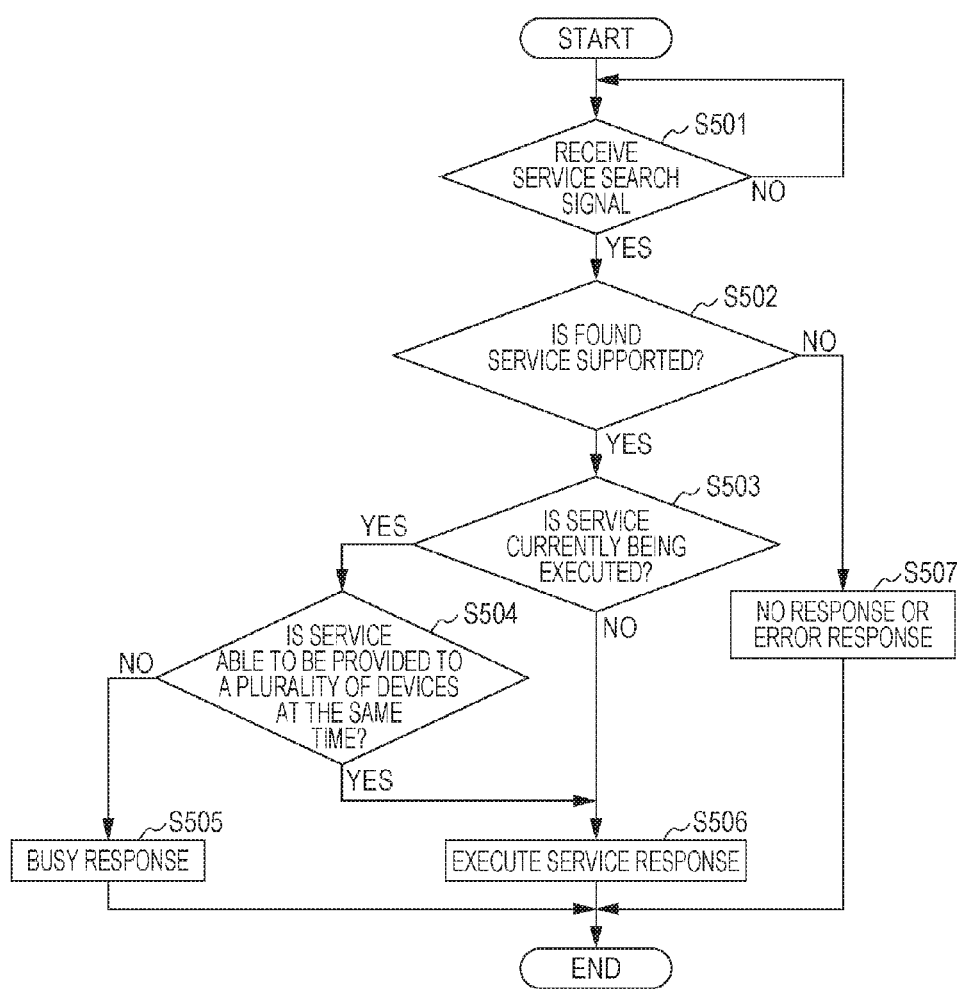
FIG. 5 is a flowchart of a communication device according to a first embodiment.

FIG. 5 is a flowchart illustrating an operation of a communication device according to this embodiment. Individual steps in the flowchart are performed when the controller 102 executes a program stored in the storing unit 103.

In S501, a communication device waits to receive a service search signal transmitted from a different communication device. If no service search signal is received, the communication device continues to wait for a service search signal until a predetermined timer has expired. When a service search signal is received in S501, the communication device checks for the contents of the received service search signal. In S502, the communication device determines whether or not the communication device is able to provide a service required in the service search signal. The determination in S502 as to whether or not the communication device is able to provide the service is performed by determining whether or not the own communication device has (supports) a function of the requested service.

When it is determined in S502 that the communication device does not support the requested service, the communication device does not respond to the service search signal or sends an error response (S507).

In contrast, when it is determined in S502 that the communication device supports the requested service, the communication device checks whether or not the own communication device is executing the service (S503). In the case of a printing service, the state where the service is being executed represents the state where any processing related to printing processing including processing for generating image data for printing, such as rendering and decoding of received print data, is being executed, and is not necessarily the state where the actual printing processing on printing paper is being performed. Furthermore, in the case of an image streaming service, not only the case where an image is being projected onto a display but any processing related to a streaming service including processing for generating data for projection is also included. The above-mentioned cases are merely examples and are not intended to limit a service.

In the case where the communication device is not executing the service in S503, since the communication device is able to accept a new service utilizing device, the communication device transmits a service response indicating that the service utilizing device is acceptable, to the service search signal (S506).

In contrast, in the case where it is determined in step S503 that the own communication device is executing the service, the communication device determines whether or not the service is able to be provided to a plurality of communication devices at the same time (S504). For example, in the case of printing processing for performing printing onto recording paper, since the service is not able to be provided at the same time, it is determined here that the service is not able to be provided. In contrast, in the case of projection onto a display, since streaming reproduction may be performed at the same time by launching multiple windows or dividing a screen into multiple screens, depending on the capability or function of the display, it is determined that the service is able to be provided.

In the case where it is determined in step S504 that the service is able to be provided to a plurality of service utilizing devices, the communication device transmits a service response indicating that a new service utilizing device is acceptable, to the service search signal (S506). In contrast, in the case where the requested service is able to be provided to only one service utilizing device at one time, the communication device transmits an error response (Busy response) indicating that processing is in progress, to the service search signal (S505). Instead of the error response indicating that processing is in progress, no response may be transmitted. Furthermore, in the case where an error response indicating that processing is in progress is transmitted, identification information on a service utilizing device that is utilizing the service, may be transmitted.

As described above, according to the first embodiment, in the case where a communication device operating as a service providing device receives, while executing a service, a request for provision of the service from a different communication device, the communication device makes a response indicating that processing is in progress, thereby preventing unnecessary service connection.

Second Embodiment

In the first embodiment, the example in which the contents of a response to a service search signal is changed according to whether or not a service providing device is able to provide the same service to a plurality of communication devices at the same time, has been explained. In a second embodiment, an example in which the contents of a response to the service search signal is changed according to a user instruction, will be explained. Since the configuration of individual communication devices in this embodiment is similar to that in FIGS. 1 and 2 of the first embodiment, explanation for the configuration of the individual communication devices will be omitted.

Figure 6:
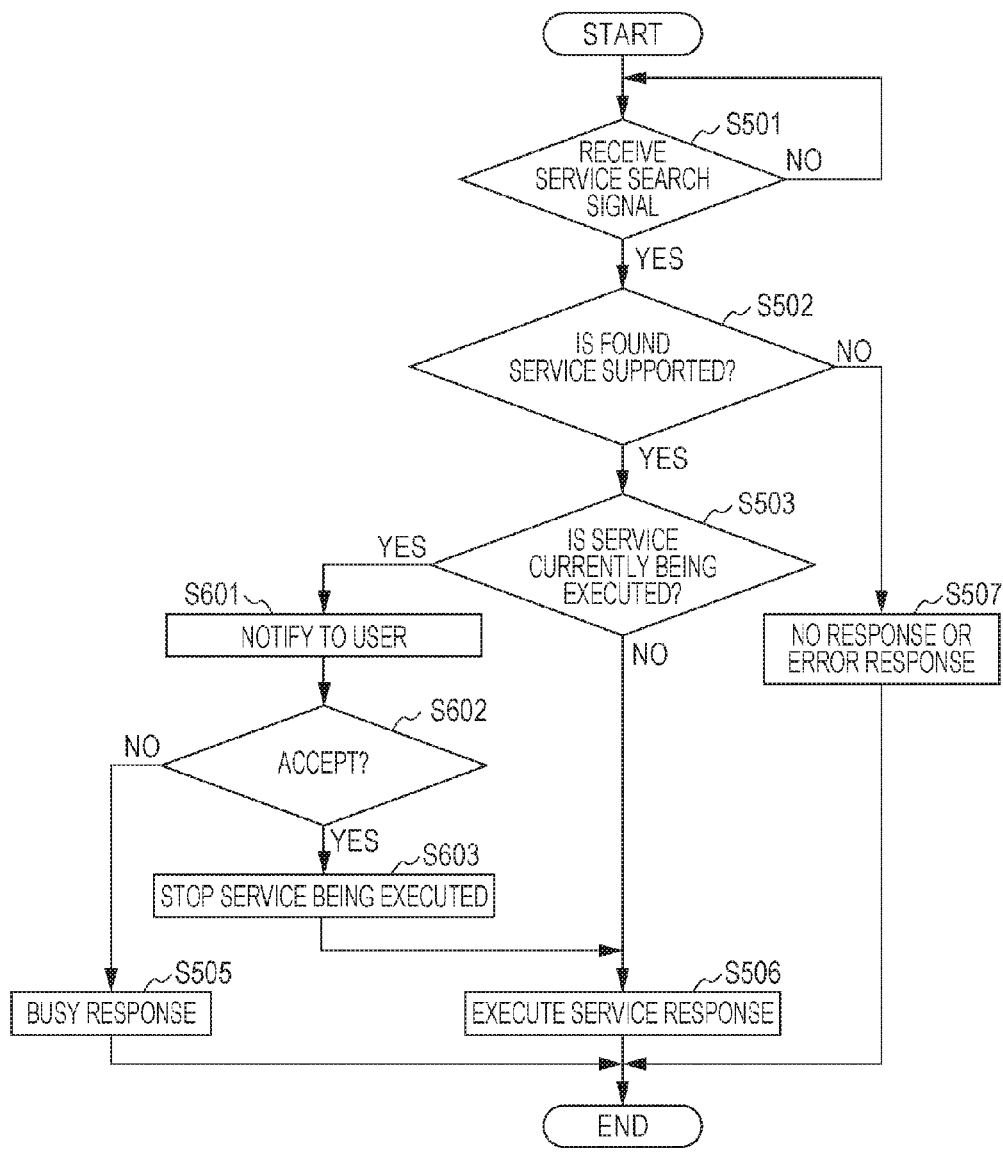
FIG. 6 is a flowchart of a communication device according to a second embodiment.

FIG. 6 is a flowchart illustrating an operation of a communication device according to this embodiment. Individual steps in the flowchart are performed when the controller 102 executes a program stored in the storing unit 103.

In the flowchart of FIG. 6, processing of S501 to S503 and S505 to S507 is the same as that in FIG. 5 of the first embodiment. Therefore, explanation for the processing of S501 to S503 and S505 to S507 will be omitted. Only differences from the first embodiment will be explained.

In the case where it is determined in S503 that the own communication device is executing the service, the communication device displays on the display unit 105 information indicating that a service request is received from a different communication device, so that a user is notified of the information (S601). By notifying the user of the information, the communication device allows the user to determine whether to accept the service request from the different communication device. The user operates the operating unit 109 of the communication device to instruct whether to accept the service request from the different communication device.

In S602, the communication device determines, based on the instruction from the user, whether or not to accept the service request from the different communication device.

When it is determined to accept the service request, the communication device stops the service that is being executed (S603). Then, the communication device transmits a service response indicating that the service request is acceptable, to the service search signal (S506).

In some cases, in order to respond to the service request from the different communication device, the communication device needs to dissolve the current P2P group and rearrange a new P2P group including the different communication device. In this case, in step S506, separation from the current P2P group may be performed.

In contrast, in the case where it is determined in step S602 that the communication device does not accept the service request, the communication device transmits an error response (Busy response) indicating that processing is in progress, to the service search signal (S606). Instead of the error response indicating that processing is in progress, no response may be transmitted. Furthermore, in the case where an error response indicating that processing is in progress is transmitted, identification information on a service utilizing device that is utilizing the service, may be transmitted.

As described above, according to the second embodiment, in the case where a communication device operating as a service providing device receives, while executing a service, a request for provision of the service from a different communication device, the communication device is able to determine, in accordance with an instruction from a user, whether or not to provide the service.

Third Embodiment

In this embodiment, an example in which in the case where a service providing device is requested for a service from a plurality of communication devices, the contents of a response to a service search signal is changed according to the role in a wireless layer of the service providing device, will be explained. Since the configuration of individual communication devices in this embodiment is similar to that in FIGS. 1 and 2 of the first embodiment, explanation for the configuration of the communication devices will be omitted.

Figure 7:
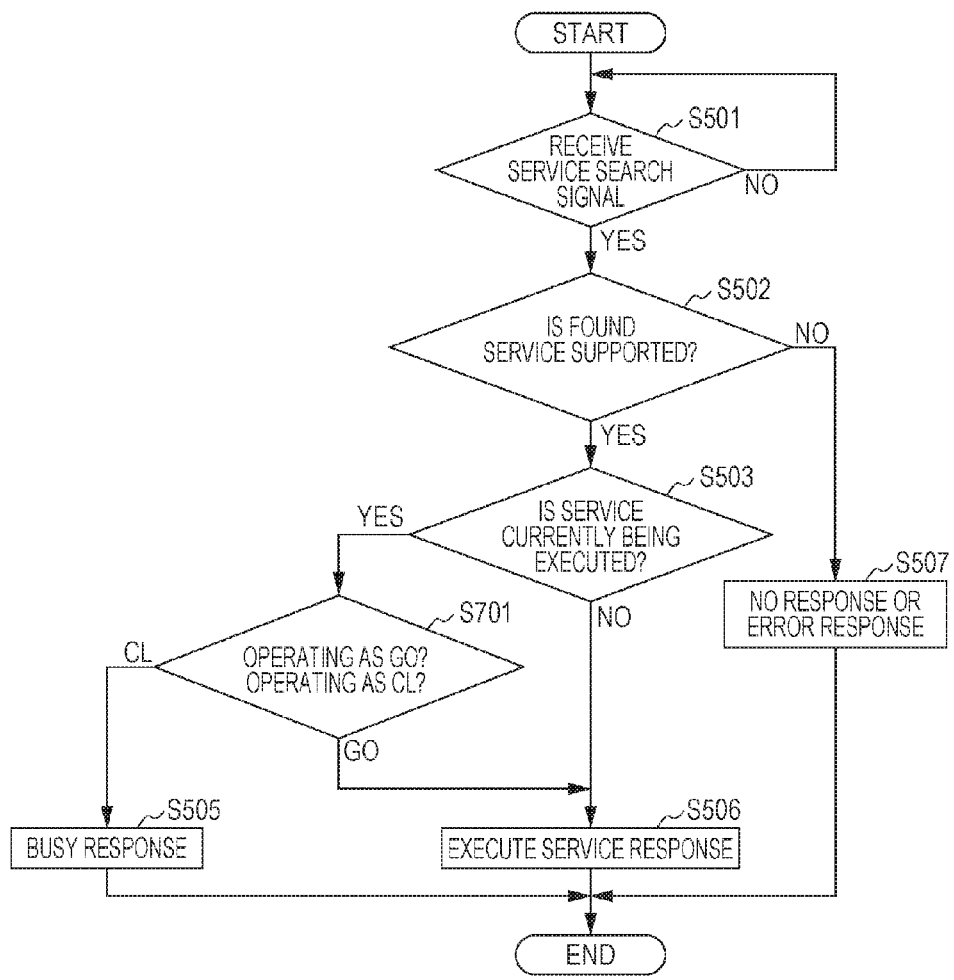
FIG. 7 is a flowchart of a communication device according to a third embodiment.

FIG. 7 is a flowchart illustrating an operation of a communication device according to this embodiment. Individual steps in the flowchart are performed when the controller 102 executes a program stored in the storing unit 103.

Since processing of S501 to S503 and S505 to S507 in the flowchart of FIG. 7 is the same as that in FIG. 5 of the first embodiment, explanation for the processing of S501 to S503 and S505 to S507 will be omitted. Only differences from the first embodiment will be explained.

In the case where it is determined in S503 that the own device is executing the service, the communication device determines the current role in the wireless layer of the own device (S701). Specifically, the communication device determines whether the own device is currently operating as a GO or a CL of Wi-Fi Direct. In the case of a GO, since the communication device is able to be connected with a plurality of communication devices, the communication device is able to provide a service to a plurality of communication devices. In contrast, in the case of a CL, connection with a plurality of communication devices may be restricted by the capability or operation policy of the device. Therefore, in the case of a CL, the communication device is not able to provide a service to a plurality of communication devices.

In the case where it is determined in S701 that the current role of the own device is a GO, the communication device proceeds to S506, and transmits a service response indicating the request is acceptable, to the received service search signal.

In contrast, in the case where it is determined in S701 that the current role of the own device is a CL, the communication device proceeds to S505, and transmits an error response (Busy response) indicating that processing is in progress, to the received service search signal. Instead of the error response indicating that processing is in progress, no response may be transmitted. Furthermore, in the case where an error response indicating that processing is in progress is transmitted, identification information on a service providing device that is utilizing the service and information indicating that the own device is a CL, may be transmitted.

As described above, according to the third embodiment, in the case where a communication device operating as a service providing device receives, while executing a service, a request for provision of the service from a different communication device, the communication device is able to determine, in accordance with the role of the own device in the wireless layer, whether or not to provide the service.

OTHER EMBODIMENTS

In the individual embodiments described above are merely examples for implementing the present invention, and various changes may be made without departing from the gist of the present invention. Further, the foregoing first to third embodiments may be combined together. Furthermore, a user may be able to select which one of the first to third embodiments each communication device operates according to.

Furthermore, in the individual embodiments described above, processing performed in the case where a communication device operating as a service providing device receives, while executing a service, a request for provision of the service from a different communication device, has been explained. However, the processing may be applied to the case where a request for provision of a different service is received. For example, in the case where a service providing device receives, while executing a printing service requested from a service utilizing device, provision of a streaming service from a different service utilizing device, the foregoing embodiments may be applied.

The communication devices in the foregoing embodiments are not necessarily digital cameras, printers, or the like. The communication devices each may be a PC, a tablet terminal, or a mobile terminal, such as a cellular phone or a smart phone. Furthermore, the communication devices each may be an image processing device, such as a copying machine, a scanner, a facsimile machine, or a multifunction machine, or a digital home electric appliance, such as a television set or a recorder.

Further, in the foregoing embodiments, the wireless LAN conforming to IEEE 802.11 has been explained as an example. However, the present invention may be implemented by different wireless communication, such as wireless USB, MBOA, Bluetooth®, UWB, or ZigBee®. Alternatively, the present invention may be implemented by a wire communication medium, such as a wired LAN. Here, MBOA is an abbreviation of Multi Band OFDM Alliance. UWB includes wireless USB, wireless 1394, and WINET.

Furthermore, the present invention is also implemented by performing the processing described below. That is, the present invention is also implemented by processing of supplying software (program) implementing functions of the foregoing embodiments to a system or a device via a network or various storage media and reading and executing, with a computer (or a CPU, an MPU, or the like) of the system or the device, a program code. In this case, the program and the storage medium storing the program form the present invention.

According to the present invention, even in a case where requests for provision of a service are received from a plurality of devices, the requests may be handled appropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
   at least one processor; and
   at least one memory storing code to be executed by the at least one processor, wherein the at least one processor executes the code to function as:
   a receiving unit configured to receive a service search signal indicating a particular service to be executed from another communication device with which the communication device does not establish a wireless connection;
   a first determination unit configured to determine whether the particular service indicated by the received service search signal is being executed with a device different from the other communication device;
a second determination unit configured to determine, in a case where the first determination unit determines that the particular service is being executed with the device different from the other communication device, whether the particular service is executable with the other communication device; and
a transmission unit configured to
transmit, in response to the received service search signal, a response indicating that the particular service is executable in a case where the first determination unit determines that the particular service is not being executed or in a case where the first determination unit determines that the particular service is being executed and the second determination unit determines that the particular service is executable with the other communication device, and
omit to transmit, in response to the received service search signal, a response indicating that the particular service is executable in a case where the first determination unit determines that the particular service is being executed and the second determination unit determines that the particular service is not executable with the other communication device.

2. The communication device according to claim 1, wherein the second determination unit determines whether the particular service is executable by determining whether the service requested with the service search signal is executable in parallel with a plurality of devices.

3. The communication device according to claim 1, wherein the particular service is a printing service or an image streaming service.

4. The communication device according to claim 1, wherein in a case where the first determination unit determines that the particular service is being executed with a device different from the other communication device and the second determination unit determines that the particular service is not executable with the other communication device, the transmission unit transmits, in response to the received service search signal, a response indicating that the particular service is being executed.

5. The communication device according to claim 1, further comprising a third determination unit configured to determine whether the communication device includes a function for the particular service indicated by the received service search signal, wherein the first determination device makes determination in a case where the third determination unit determines that the communication device includes the function for the particular service.

6. The communication device according to claim 1, wherein the service search signal is transmitted through an action frame defined by Institute of Electrical and Electronics Engineers (IEEE) 802.11 standard.

7. The communication device according to claim 1, wherein the communication device operates as a peer-to-peer (P2P) group owner defined by Wi-Fi direct standard or a P2P client.

8. A method for a communication device comprising:
receiving a service search signal indicating a particular service to be executed from another communication device with which the communication device does not establish a wireless connection;
determining whether the particular service indicated by the received service search signal is being executed with a device different from the other communication device;
determining, in a case where the particular service is determined to be executed with the device different from the other communication device, whether the particular service is executable with the other communication device;
transmitting, in response to the received service search signal, a response indicating that the particular service is executable in a case where the particular service is determined not being executed or in a case where the particular service is determined to be executed and the particular service determined to be executable with the other communication device; and
omitting to transmit, in response to the received service search signal, a response indicating that the particular service is executable in a case where the particular service is determined to be executed and the particular service is determined not executable with the other communication device.

9. A non-transitory storage medium having instructions for a communication device, when executed by a processor, cause the processor to perform operations comprising:
receiving a service search signal indicating a particular service to be executed from another communication device with which the communication device does not establish a wireless connection;
determining whether the particular service indicated by the received service search signal is being executed with a device different from the other communication device;
determining, in a case where the particular service is determined to be executed with the device different from the other communication device, whether the particular service is executable with the other communication device;
transmitting, in response to the received service search signal, a response indicating that the particular service is executable in a case where the particular service is determined not being executed or in a case where the particular service is determined to be executed and the particular service determined to be executable with the other communication device; and
omitting to transmit, in response to the received service search signal, a response indicating that the particular service is executable in a case where the particular service is determined to be executed and the particular service is determined not executable with the other communication device.

* * * * *